Jan. 4, 1966     K. M. HOLLAND     3,227,600
FORMABLE HONEYCOMB
Filed Dec. 18, 1962
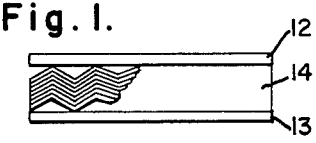
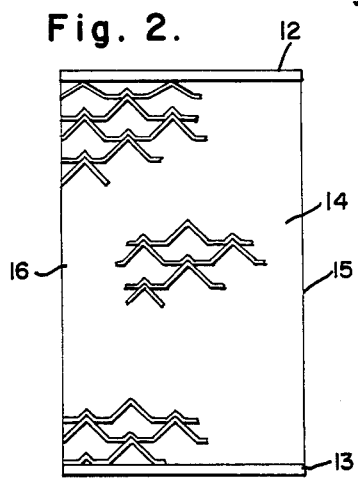
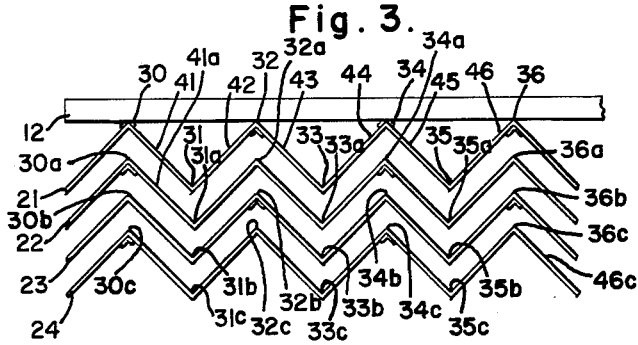
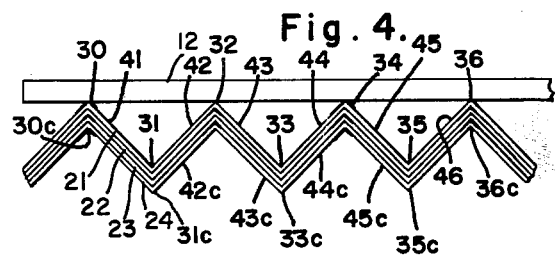
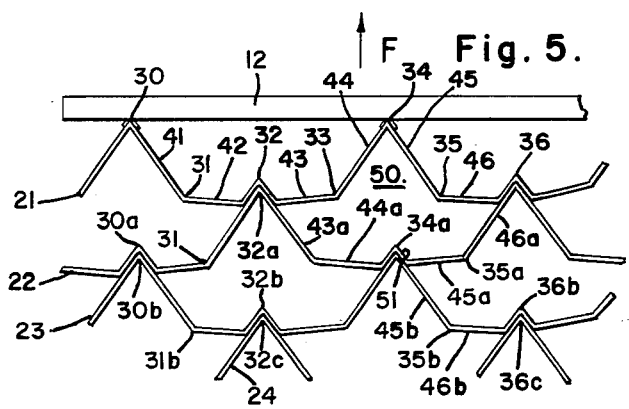
INVENTOR.
Kenneth M. Holland
BY
Townsend and Townsend
Attorneys

United States Patent Office 3,227,600
Patented Jan. 4, 1966

3,227,600
FORMABLE HONEYCOMB
Kenneth M. Holland, Orinda, Calif.
(2332 4th St., Berkeley 10, Calif.)
Filed Dec. 18, 1962, Ser. No. 245,607
6 Claims. (Cl. 161—68)

This invention relates to a new honeycomb type cellular structure and more particularly to a honeycomb structure which is readily formable into simple and compound curvatures.

More conventional honeycomb in its expanded multi-cellular form comprises a plurality of corrugated or sinusoidally curved ribbons or webs of flat sheet material (such as paper, metal, resin impregnated fabrics, plastics or the like) which said ribbons or webs are bonded together at their contacting or abutting nodes. Conventional honeycomb is normally fabricated in the form of flat panel sections and such material is characterized by the fact that when an effort is made to bendably deform it to form a simple curve along one major axis, an anticlastic effect develops in that a saddle-back or reverse curve will tend to form along the other major and perpendicular axis of the material. The anticlastic properties of conventional honeycomb are discussed in prior United States Patent No. 2,668,327.

In applications where it is desired to form honeycomb strctures into bodies having simple or compound curvatures, it is desirable to provide honeycomb that can be readily formed into such shapes while at the same time provide a material (1) that will not display substantial anticlastic properties so characteristic of conventional hexagonal honeycomb, (2) that will not crush or otherwise fail under stresses attendant with the forming of the material into curved bodies and which is also characteristic of conventional honeycomb, (3) that provides good physical properties to enable the use of the material in honeycomb sandwich structures where high strentgh-to-weight ratios are characteristically obtainable, and (4) that does not use an excess amount of material in order to provide for formability. In this latter connection I am aware of certain prior art proposals to make formable core but which uses excessive material to accomplish its purposes of formability which means an increase in density (weight) as well as an uneconomic use of the amount of material used.

A principal object and advantage of the present invention is to provide a unique honeycomb structure which is readily formable into simple and compound curvatures and which provides desirable physical characteristics generally comparable to more conventional honeycomb in flat form whereby sandwich structures incorporating honeycomb embodying the present invention can be designed to utilize the excellent strength-weight ratios that is characteristic of honeycomb sandwich construction.

Another object of the invention is that the material can be made in the form of expandable packs which in many instances provides important economic and other advantages as well as advantages from the manufacturing standpoint. On the other hand, in dealing with certain types of material such as very heavy gauge metals, or material with poor ductility, where it is difficult or impossible to expand the material from pack form, honeycomb embodying the present design may be fabricated by first corrugating the individual webs or ribbons to desired nominal cell size configuration and then bonding these individual webs or ribbons to one another at their proper node points whereby the honeycomb section is made in the first instance in the form of fully expanded open cell honeycomb strcture.

Another object and advantage of the invention is that when the material is made in the form of an expandable pack, it retains a reasonably constant width in both unexpanded and fully expanded condition. Conventional honeycomb made in the form of flat planar ribbons bonded together at preselected spaced and appropriately staggered node points when expanded in the direction of its length will pursably contract or narrow in the direction of its width to perhaps .75 the width of the original pack in unexpanded form. This phenomenon of honeycomb is discussed in prior United State Patent No. 2,674,295 and such phenomenon can lead to variouse types of manufacturing and fabricating difficulties or shortcomings. Honeycomb made according to the present invention will, when expanded to nominal cell size, retain a width equal to perhaps .92 to .90 of the width of the pack in unexpanded condition, and which makes its use more attractive in certain types of manufacturing operations over conventional honeycomb with a .75 width reduction as aforesaid.

A more specific object of this invention is to provide an expandable pack of multi-cellular honeycomb type material capable of providing the advantages above named which is made up of a plurality of stacked pre-corrugated ribbons each defining alternate zenith and nadir points which, in unexpanded stacked relationship are mutually nested together to form a compact pack of material. Each ribbon in the stack is bonded (as by organic adhesive, welding, soldering, brazing, or the like) to each of its adjacent ribbons only at every other zenith point and with the bonding points of adjacent ribbons being mutually staggered relative to one another whereby said pack can be expanded into an open cellular structure comprising a plurality of cells each defined by substantially eight major wall areas that are angularly disposed relative to one another.

Other objects and advantages of the invention will become apparent from the following detailed description in connection with the accompanying drawings, in which:

FIG. 1 shows a fragmentary view of an unexpanded pack of honeycomb embodying the invention.

FIG. 2 shows the pack of FIG. 1 expanded.

FIG. 3 shows an enlarged fragmentary exploded view of the corrugated ribbons prior to bonding.

FIG. 4 shows an enlarged fragmentary view of the honeycomb ribbons unexpanded and bonded.

FIG. 5 illustrates an enlarged fragmentary view of the expanded honeycomb ribbon.

The unexpanded pack of honeycomb 14 of FIG. 1 is shown with its end webs bonded to rigid or stiff end members 12 and 13. All of the ribbons are identically pre-corrugated with the same zig-zag wave line so that the alternative zenith and nadir points can be nested together. Selected node points of adjacent ribbons are bonded to one another, as will more fully appear hereinafter, to allow controlled separation of the adjacent ribbons.

As the pack is expanded, a uniform unfolding of the ribbons occurs to define an orderly array of hollow multi-angular cells. Assuming in the usual case that the ribbons are all the same length, the resultant honeycomb cellular core will be rectangular in appearance having linear side edges 15 and 16.

Referring particularly to FIGS. 3 and 4, it is seen that each ribbon has a series of V-shaped corrugations along its entire length. Ribbon 21, for example, defines a series of alternate zenith and nadir points numbered consecutively 30–36. These zenith and nadir points are joined by alternately downwardly and upwardly extending flat ribbon portions or segments numbered consecutively 41–46, inclusive. Each additional ribbon in the pack (as numbered 22–24 consecutively) is corrugated identically to ribbon 21 and each defines alternate zenith and nadir points which are joined by flat ribbon sections. Corresponding parts of all the ribbons 22–24 are therefore numbered similarly to ribbon 21 but are suffixed by the letters *a*, *b* and *c* respectively to distinguish them in the drawings.

As shown in the drawings, each ribbon is bonded to an adjacent ribbon at every other zenith point with alternate adjacent ribbons being bonded at staggered zenith points with relation to one another. Thus, for example, it is seen that ribbon 21 is bonded at its zenith points 30 and 34 to rigid end member 12 and with zeniths 32 and 36 in contact with, but not bonded to said member 12. Ribbon 22 is bonded to ribbon 21 at zenith points 32–32*a* and 36–36*a* which said bonding points are in staggered relation to bonding points 30 and 34 previously mentioned. Ribbon 22 is also bonded to its other adjacent ribbon 23 at bonding points 30*a*–30*b* and 34*a*–34*b* which in turn are staggered relative to points 32–32*a* and 36–36*a*. Ribbon 24 is bonded to ribbon 23 at zenith points 32*b*–32*c* and 36*b*–36*c* which of course are staggered relative to the points whereat ribbon 23 is bonded to ribbon 22 as above specified. Such pattern of alternate bonding points is continued throughout the entire pack of material.

A honeycomb pack consisting of a plurality of corrugated ribbons bonded to one another in the pattern above explained can be expanded to form an open cellular structure of the character indicated particularly in FIG. 5 of the drawings. Expansion of the pack can be accomplished by pulling apart the end webs secured to the rigid members 12 and 13 such as exemplified by FIGS. 1 and 2 of the drawings. As the pack is expanded, the ribbons separate along the adjacent surface areas which are not bonded to one another, and an unfolding of the ribbons occurs to create an array of similarly shaped cell openings each cell of which (in the particular embodiment of the invention shown in the drawings) is defined by eight major wall areas. Thus, for example, FIG. 5 shows an expanded cell 50 as being defined by flat sections 43, 44, 45 and 46 of ribbon 21 and by wall sections 43*a*, 44*a*, 45*a* and 46*a* of adjacent ribbon 22. It is noted that at the node bonding point 34*a*–34*b* where ribbon 22 is bonded to ribbon 23*a*, rib or projection 51 is formed. The multi-angular shape of the cells in conjunction with the ribs or projections formed at the bonding points (such as indicated at 51) provides excellent structural rigidity in the columnar cell direction.

In expanded form, and as shown in FIG. 5, the major wall areas of each cell define pairs of adjacent wall intersections, some including angles of intersection of less than 180° and others including angles of intersection greater than 180°. More specifically, and as shown in the embodiment of FIG. 5, in the cell indicated at 50, the angles of intersection between pairs of walls 44–45, 43–43A, 43A–44A, 44A–45A, 45A–46A, and 46–46A, include interior angles of less than 180°; whereas, the interior angle of intersection between each pair of walls 43–44 and 45–46 is greater than 180°. It is further noted that the angles of intersection between walls 44–45, 43–43A, 44A–45A, and 46–46A occur at the bonded intersecting node points of the said walls; whereas, the intersections between walls 43–44, 43A–44A, 45A–46A, and 45–46 occur at unbonded points or regions of intersection between the said pairs of walls.

When the pack is expanded in a flat plane, all of the individual cell axes will extend in a common or parallel direction and all of the ribbons and creases formed at the zenith and nadir points remain parallel to one another. The cellular material is, however, readily formable into curved shapes to define simple or compound curvatured bodies without exhibiting anticlastic properties as commonly observed in reference to more conventional honeycomb. Bending or flexing the material will subject the individual ribbons to complex stresses and forces which will result in re-orienting the cell axes out of parallel alignment with each other and which will further result in the zeniths and nadirs assuming a skewed relationship relative to one another. For example, the cell wall areas 41–46 between the rigid bonding points are subjected to complex torsional forces and accordingly will flex and bend in a complex pattern so that the material can conform itself to the curvatured contour of the shape into which it is being formed. The unique cell configuration of the material provides sufficient flexibility for the ribbons to flex and bendably deform to assume fairly sharp radii of curvature without crumpling or without physically failing either the node bonding points or the ribbon material itself. In this latter connection, I am aware of other types and forms of honeycomb material which can only be contoured to a very limited extent without causing an actual failing of the ribbon material or a rupturing of the node bonds.

Another characteristic and highly desirable quality of honeycomb embodying the present invention, and as earlier pointed out, is that honeycomb of the present type when expanded to nominal cell size will retain a width (ribbon direction) of about .92 to .9 of its original width in unexpanded condition. This is compared to more conventional hexagonal honeycomb which will reduce in width to about .75 of its original width in unexpanded pack form. The ability to maintain the honeycomb with a more uniform width has practical advantages in many applications, as for example, when it is required to expand a honeycomb within a confined rectangular area such as within the confines of a hollow panel door frame.

Although for purposes of more convenient explanation the drawings show the end webs or ribbons of the honeycomb section bonded to the rigid members or rails 12 and 13, it is understood that the utilization of any such members is simply a matter of choice and there is no necessity for bonding the end webs to any type of rigid member whatsoever. It may also be added that honeycomb made according to the present invention can be expanded substantially in accordance with any of a variety of well known and commonly employed methods used to expand more conventional types of honeycomb material.

It is also pointed out that although the invention has been described in reference to corrugating, bonding and stacking of "ribbons" to form a pack of expandable honeycomb material, the term "ribbons" as used herein and in the claims is intended to include relatively large rectangular sections of sheet material which can be corrugated, bonded and stacked in the manner herein described to form a parent block or pack of the honeycomb from which thinner slices of honeycomb can be sawed or sliced to desired thickness or "T" dimension. The technique of manufacturing parent blocks or packs of more conventional honeycomb by bonding and stacking together relatively large rectangular sections of sheet material and from which can be sliced or sawed smaller sections of honeycomb of desired thickness is well known and understood in the art of honeycomb manufacture as exemplified for example by prior U.S. Patent No. 2,734,843 dated February 14, 1956.

Although in the particular embodiment of the invention shown in the drawings the individual ribbons are corrugated to define rather sharp pointed zenith and nadir points, it is possible to pre-form the ribbons with more rounded or flattened undulations or sinusoidally contoured corrugations.

It is also possible to make alternate corrugations in each web of somewhat different wave length or shape so long as the matching corrugations of adjacent ribbons in the stack are designed and proportioned to nest with each other and to permit bonding of adjacent ribbons together at every other zenith point as above disclosed.

It will be understood that various changes in the details, shape, arrangement of parts and steps, which have been herein described and illustrated in order to explain the nature of the invention, may be made by those skilled

I claim:

1. A pack of honeycomb material which is expandable to a non-planar contour, comprising: a plurality of elongated ribbons of equal dimensions, each ribbon having undulating corrugations of the same pattern along its entire length, each said ribbon being aligned one within the other in stacked relationship; bonding points at equally spaced intervals along the ribbons, each said bonding point securing the adjacent ribbons against separation at the bonded point when the pack is in expanded position, said adjacent ribbons being separable along the remaining unbonded adjacent surfaces to form congruent eight major sided hollow cells, the wall area of each cell including a length of ribbon having alternating bonded and unbonded undulation creases.

2. In the art of honeycomb which is expandable to a non-planar contour; a pack of corrugated ribbons each defining alternate zenith and nadir points; all of said ribbons in compacted pack form disposed with mating corrugations in contacting nested relationship with one another; means bonding each ribbon in the pack to its adjacent ribbons at not less frequent intervals than at every other mutually contacting zenith point, and with the bonding points joining alternate ribbons being staggered relative to one another; said pack of ribbons being expandable to form an open cellular honeycomb structure comprising a plurality of cells each defined by not less than eight major wall areas angularly disposed relative to one another.

3. A honeycomb pack as set forth in claim 2 in which six of the cell sides of the fully expanded pack are oriented at an inside angle of less than 180° to an adjacent cell side and two cell sides are oriented at an inside angle greater than 180° to an adjacent cell side to form a closed cell.

4. In the art of honeycomb, a material readily formable to a non-planar contour without exhibiting substantial anticlastic properties, comprising: a stack of corrugated ribbons each defining alternate upper and lower regions of corrugation; all of said ribbons in stacked arrangement having said upper regions in contact with and bonded to lower regions of an adjacent ribbon and with the bonding points joining alternate ribbons being staggered relative one another; said stack of ribbons defining an open cellular honeycomb structure comprising a plurality of multiple-wall cells each defined by at least six walls forming three pairs of adjacent walls, the walls of each said three pairs extending generally in two directions which include an interior angle not greater than 180° and joined to one another at said bonding points; and at least four walls of each cell all formed in the same ribbon defining two other pairs of adjacent walls, the walls of said last pairs extending generally in two directions which include an interior angle greater than 180° and joined to one another at an unbonded intersection.

5. A method for making honeycomb material which can be controllably contoured to non-planar surfaces comprising the steps of: corrugating a plurality of ribbons with mating undulations having alternate zenith and nadir points; stacking said plurality of ribbons with their corrugations in mated relationship to one another; bonding each said ribbon to an adjacent ribbon at least at every other mutually contacting mated zenith point and with the bonding zeniths of alternate ribbons being staggered relative to one another; expanding said ribbon pack to form a plurality of multi-angular hollow cells.

6. A method for making an expandable pack of honeycomb material which can be controllably contoured to non-planar surfaces comprising the steps of: corrugating a plurality of ribbons with a series of evenly spaced alternating zeniths and nadir points along their entire length; bonding each said ribbon to an adjacent ribbon at least at every other mutually contacting zenith point and with the bonding zeniths of alternate ribbons being staggered relative to one another; expanding said ribbon pack to form a plurality of multi-angular hollow cells.

References Cited by the Examiner

UNITED STATES PATENTS

| | | | |
|---|---|---|---|
| 2,654,686 | 10/1953 | Hansen | 161—68 |
| 2,668,327 | 2/1954 | Steele | 156—197 |
| 2,670,314 | 2/1954 | Ungar | 156—197 |
| 2,674,295 | 4/1954 | Steele et al. | 156—197 |
| 2,734,843 | 2/1956 | Steele | 156—197 |
| 2,750,313 | 6/1956 | Schwartz et al. | 161—69 |
| 2,848,132 | 8/1958 | Davous | 156—197 |
| 2,962,403 | 11/1960 | Jones | 161—68 |
| 3,016,315 | 1/1962 | Robinson | 156—197 |
| 3,018,205 | 1/1962 | Barut | 156—197 |
| 3,032,458 | 5/1962 | Daponte et al. | 161—68 |
| 3,044,921 | 7/1962 | Wentworth et al. | 156—205 |
| 3,109,766 | 11/1963 | Norris | 156—197 |

FOREIGN PATENTS

| | | |
|---|---|---|
| 525,128 | 5/1956 | Canada. |
| 15,900 | 1890 | Great Britain. |

EARL M. BERGERT, *Primary Examiner.*